United States Patent [19]

Pullen

[11] 4,361,377
[45] Nov. 30, 1982

[54] PORTABLE COMPACT MICROSCOPE

[76] Inventor: Joel F. Pullen, Rte. 1, 83B Lupine La., Templeton, Calif. 93465

[21] Appl. No.: 224,054

[22] Filed: Jan. 12, 1981

[51] Int. Cl.³ .............................................. G02B 21/06
[52] U.S. Cl. ......................................... 350/8; 350/87; 350/90
[58] Field of Search .................... 350/8, 46, 84, 87, 90, 350/235, 236, 238, 239

[56] References Cited

U.S. PATENT DOCUMENTS

| 3,582,181 | 6/1971 | de Chveca | 350/46 X |
| 3,736,041 | 5/1973 | McArther | 350/87 |
| 3,971,622 | 7/1976 | Yoshinaga | 350/87 |

FOREIGN PATENT DOCUMENTS

| 2531245 | 1/1977 | Fed. Rep. of Germany | 350/238 |
| 238357 | 10/1945 | Switzerland | 350/84 |

Primary Examiner—Vincent P. McGraw
Assistant Examiner—Matthew W. Koren
Attorney, Agent, or Firm—Thorpe, North & Western

[57] ABSTRACT

A portable compact microscope for examining vertically disposed slides comprising a housing consisting of top and bottom covers, having mounted therein an optical system having a direct light pathway comprising a single lens eyepiece, an intermediate focus wheel and an adjustable double lens objective, a spring loaded slide holder forward of said objective, a slot in the housing covers by which a slide is introduced into the spring loaded slide holder and a deflector means forward of said slide holder by which light from a light source passes through the slide to be viewed. Parallel to the optical system is a battery powered light source, means to regulate the light intensity of the source and means to actuate the light source.

6 Claims, 6 Drawing Figures

PORTABLE COMPACT MICROSCOPE

BACKGROUND OF THE INVENTION

This invention comprises a portable compact microscope for use in examining slides quickly and efficiently.

Presently there is a need in the practice of medicine to provide a better and faster means of diagnosing and treating patients without unduly inconveniencing them. Often during the examination of a patient, a doctor must send samples to the lab for lab tests while the patient waits for the results. The patient must wait in some instances because positive tests might require that treatment of a diagnosed condition begin immediately. Therefore, faster diagnosis would considerably upgrade patient care and treatment.

Such problems are particularly marked and prevalent in the diagnosis and treatment of vaginal infections such as Trichomonas vaginalis and Minilias. In a conventional laboratory setting, after the vaginal walls have been swabbed or scraped to diagnose for such infections, the specimen must be rushed to a lab away from the patient and much time taken to prepare a hanging drop wet mount slide after which the diagnosis is made. During this time-consuming process the patient often must lie uncomfortably in the lithotomy position on the table in the examination room with a speculum in position so that treatment can be started immediately if the diagnosis is positive.

To upgrade patient comfort and care, it would be of utmost benefit to arrive at a rapid but accurate means of diagnosing such infections in the examination room. For such diagnosis, a compact portable microscope holding a wet mount slide would be desirable.

U.S. Pat. No. 3,582,181 issued June 1, 1971 teaches a portable pocket microscope having its own light source so as to be available for usage in a variety of locations. This microscope is in two sections which be press fitted together in a telescopic relationship. A two lens eyepiece is mounted in one tubular section and a two-lens objective, light source and object slide slot are located in the second tubular section. The fitting together of the two tubular sections under pressure produces a telescope arrangement which is elongated and, therefore, not truly compact in nature. This prior art microscope provides a light source which is constant whereas an adjustable light source is to be preferred.

SUMMARY OF THE INVENTION

It is an object of the present invention to provide a portable compact microscope for use in a medical examination room setting.

It is also an object of the present invention to provide a compact microscope wherein a self-contained light source is adjustable in intensity so as to penetrate thicker wet mount slides as well as dry slides.

It is further an object of the present invention to provide a compact microscope wherein the slides are viewed in a vertical position.

These and other objects may be accomplished by means of a compact microscope having a generally rectangular housing containing, in series, an eyepiece with a single lens, a two-lens objective mounted so as to be adjustable, a spring loaded blank or slide holder into which the slide is introduced by a receiving slot in the housing and a prism which acts as a deflector to direct light through the object slide into the objective and through the eyepiece to the observer. The housing also contains a lamp, a lamp adjustment wheel which regulates the light intensity by a connection to a potentiometer and batteries. For purposes of compactness, the elements of the lighting system are not in alignment with the direct observation path. Also connected into the lighting system is an on-off switch.

The housing consists of a two-piece microscope case with the various microscope elements being mounted and held in the bottom cover of the case which is then enclosed by the top cover and there held in place. In order to more efficiently replace the batteries and the lamp, the microscope case is provided with an access panel.

The preferred embodiment will hereinafter be described in detail.

DRAWINGS

DETAILED DESCRIPTION

Figure 1:
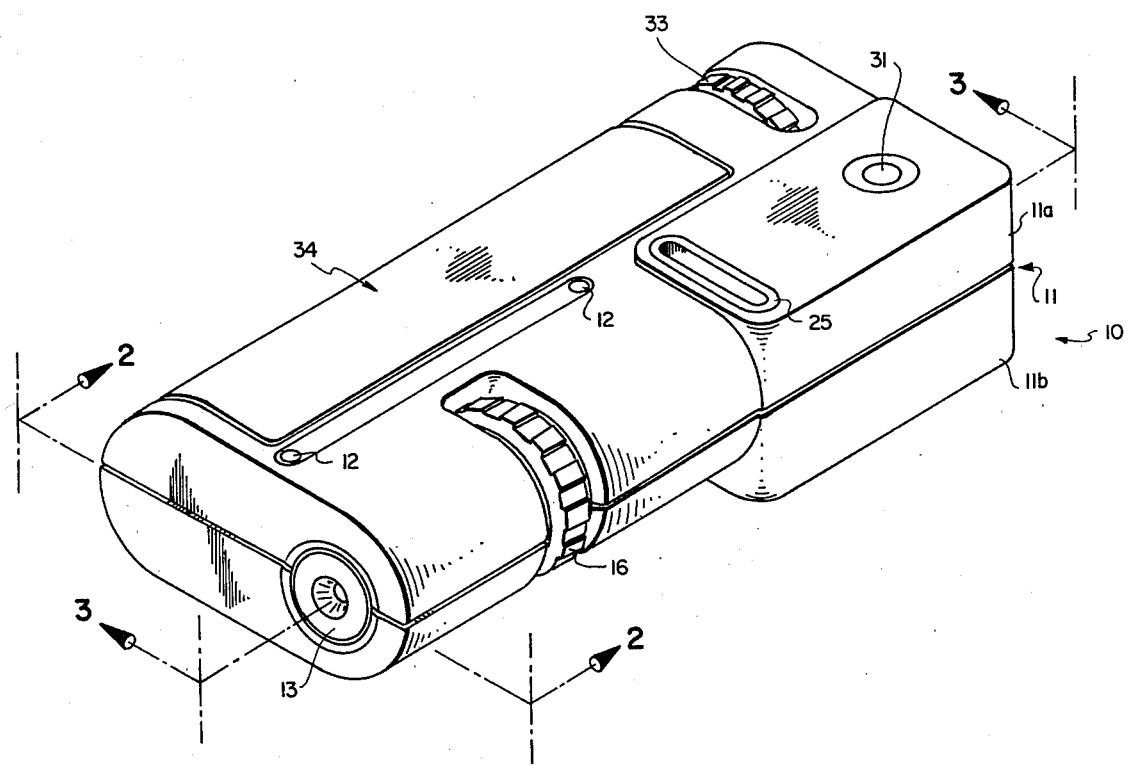
FIG. 1 is a pictorial view of one embodiment of the microscope of the invention.

There is shown in FIGS. 1-6 a complete embodiment of the invention.

The microscope 10 is contained in a housing which is of molded plastic and is divided horizontally into a lower or base section 11b and an upper or cover section 11a. The two sections are fastened together by screws 12 which extend through cover 11a and screw into a boss 12a in base 11b.

Figure 2:
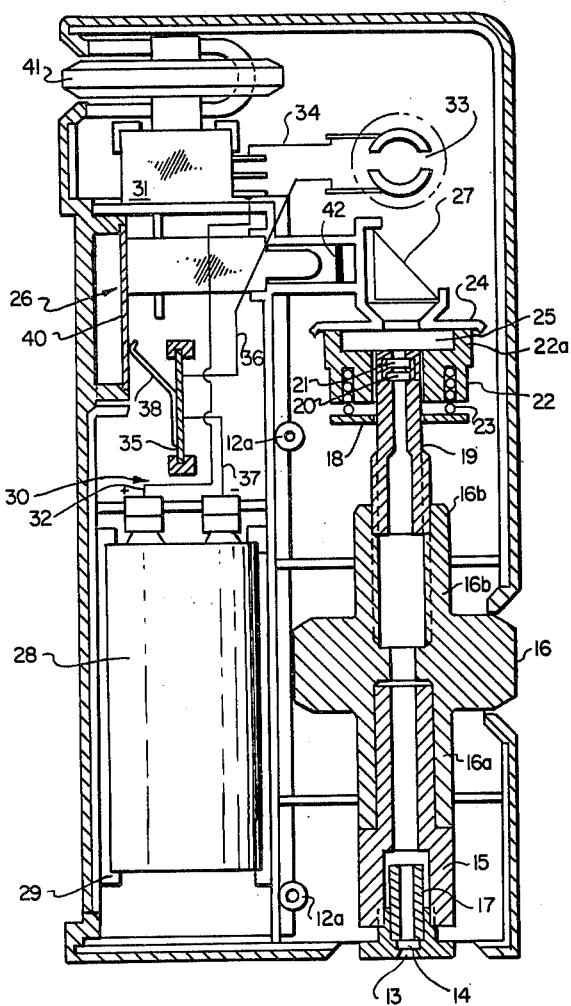
FIG. 2 is a horizontal cross-sectional view of the microscope taken along lines 2—2 of FIG. 1.
Figure 3:
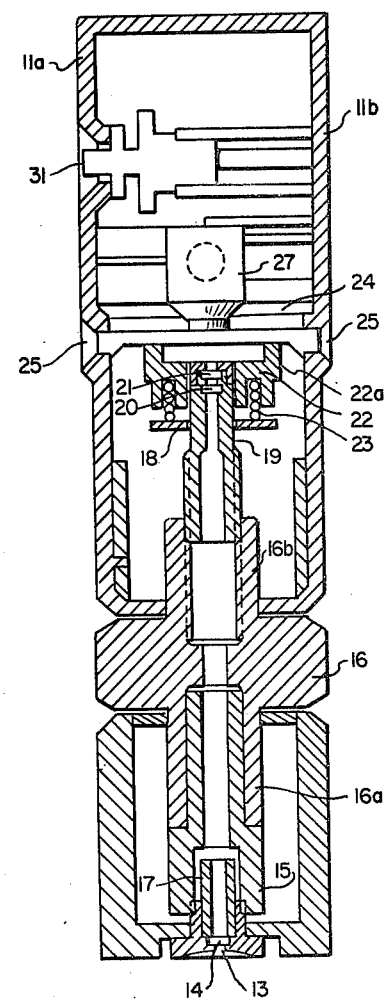
FIG. 3 is a side cross sectional view of the microscope taken along lines 3—3 of FIG. 1.
Figure 4:
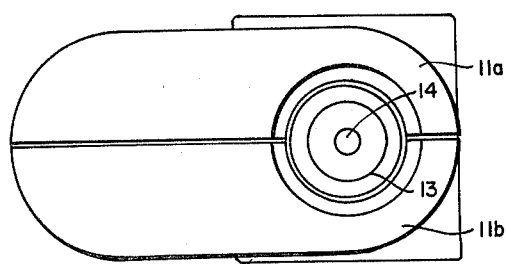
FIG. 4 is a rear elevational view of the microscope showing the eyepiece and the joining of the bottom and top covers.

FIGS. 2 and 3 show the optics and lighting system of the microscope. A threaded eyepiece 13 containing a single lens 14 held in position by an insert 17 passes through the rear wall of housing 11 and screws into an eyepiece adapter 15. The forward portion of eyepiece adapter 15 is slidably fitted into a portion of focus wheel 16 as illustrated. The focus wheel 16 has a backwardly extending tube 16a and a forwardly extending threaded tube 16b with tube 16a extending backwardly around the forward part of eyepiece adapter 15. The eyepiece adapter is held in position within base 11b by fastening means not shown.

Threaded into tube 16b is a hollow adjustable microscope tip 19 which is slidably fitted into a washer 18 attached to housing base 11b. Microscope tip 19 moves forward or backward within tube 16a as focus wheel 16 is turned.

The hollow microscope tip 19 narrows in diameter at the forward end to house double lenses 20 and 21. Tip 19 extends into a central aperture in spring loaded slide holder 22. Slide holder 22 is tensioned away from washer 18 by springs 23 as illustrated. A retainer 24 is molded into housing base 11b forward of slide holder 22 and has a central aperture in alignment with lenses 20 and 21. Slide holder 22 has forwardly extending arms 22a which rest against retainer 24. The area bounded by slide holder 22, retainer 24 and slide holder arms 22a thus become the slide receiving slot 25 which is adjustable in size by the backward movement of slide holder 22 and compression of springs 23.

The viewing path as has been described is a direct path not requiring prisms or other optical devices used when a direct viewing path is not available. While the magnification of the double lenses in the objective and eyepiece may vary according to usage desired, the double lenses in the objective may have a primary magnification of × 30, and the eyepiece lens 14 may have a magnification of × 10 providing a total magnification of × 300. The double lenses in the objective may typically provide a magnification of from about × 20 to × 40, and the eyepiece lens may provide a magnification of from about × 5 to × 20.

The remainder of the elements within housing 11 provide an adjustable backlighting system. These consist of a light bulb 26 seated in base 11b of housing 11 at right angles to the viewing pathway. A prism 27 which will deflect light from light bulb 26 at 90 degree angles is fixedly secured to housing base 11b on the opposite side of the central aperture of retainer 24 from slot 25 and adjacent the end of light bulb 26.

The light 26 is powered by a battery 28 enclosed in battery clips 29 located in compartment 30 which is parallel to the viewing path of the microscope as illustrated in FIG. 2. The positive terminal of the battery is electrically connected to a potentiometer 31 via line 32. The potentiometer 31 is electrically connected to an on/off switch 33 via line 34. The on/off switch 33 is electrically connected to one section of a split printed circuit board 35 via line 36. The negative terminal of battery 28 is connected to the other section of the split printed circuit board 35 via line 37. Each section of the printed circuit board 35 has riveted or otherwise attached thereto a spring contact 38.

Figure 5:
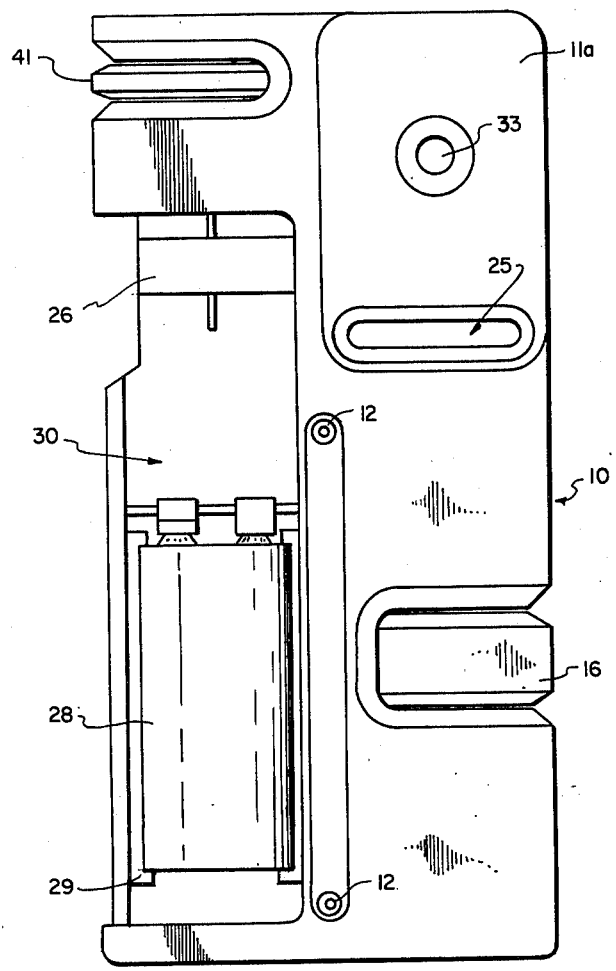
FIG. 5 is a top view of the microscope with the battery-lamp access cover removed to show the enclosed batteries and lamp.
Figure 6:
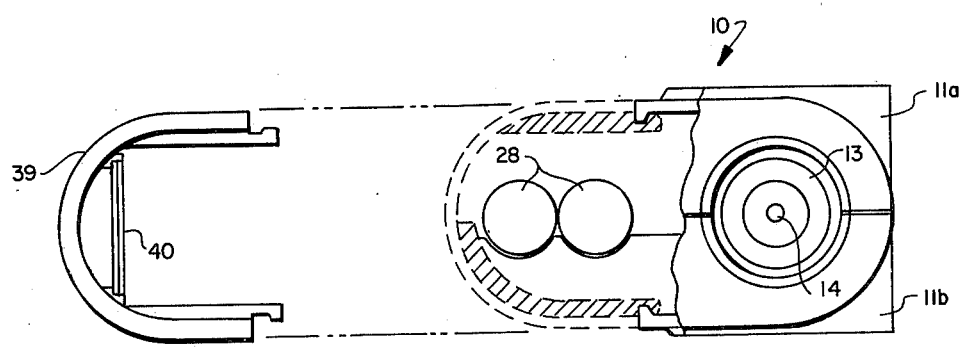
FIG. 6 is a rear elevational view similar to FIG. 4 but is partially broken away and shows the access panel in a detached position.

A portion of housing 11 has a removable access panel 39 as shown in FIGS. 5 and 6 to provide access into the housing compartment 30 for replacing spent batteries and bulbs. Panel 39 is snap-fitted into the housing and has appropriately attached thereto a split printed circuit board 40. When the access panel 39 is closed, the printed circuit board 40 is brought into contact with spring contacts 38 and also contacts the base of light bulb 26 thereby completing the electrical circuit. The on/off switch 33 opens and closes the electrical circuit when access panel 39 is in place. The potentiometer 31, operated by a light adjustment wheel 41, controls the flow of electricity to bulb 26 by altering the resistance and hence controls the light intensity of the bulb backlighting a slide placed in the microscope slot 25.

The electrical components are conventional "off the shelf" items and no claim is made to these components individually or to the circuitry. The precise manner in which the electrical components are arranged or secured in the housing is not critical provided the compact nature of the housing and the direct viewing path of the optical system with backlighting is maintained.

The operation of the microscope is essentially the same as with other microscopes except that the optical path is horizontal and is shorter than with most microscopes. Because of the short viewing path, a condenser is not needed to concentrate the light. However, a disc diffuser 42 is employed.

The microscope is specifically constructed to use a vertical wet mount slide. In operation, a liquid specimen, such as obtained from the vaginal walls of a patient, is placed in a cavity in a wet mount slide which is then inserted into the slide receiving slot 25 in the microscope. The slot extends through the entire vertical width of the housing so that the bottom of the slide may extend below the floor of base 11b. This feature provides for any degree of vertical adjustment. The light is activated by pushing switch 33 and the light intensity is adjusted by wheel 41. The specimen is brought into focus by turning focus wheel 16 which slides the objective 17 and 19 within washer 18 until the desired object clarity or sharpness is obtained.

The microscope is compact and may be used in any variety of situations other than an examination room setting. The microscope is also useful in viewing conventional slides.

While the microscope as has been disclosed constitutes a preferred embodiment, changes or modifications in shape or structure may be made without departing from the scope of this invention which is to be limited only by the appended claims.

I claim:

1. A compact portable microscope for vertical viewing of slides comprising;
   a. a generally rectangular housing divided into a lower base section and an upper cover section, said sections being interconnectable by fastening means,
   b. a horizontally mounted direct path optical system located within said housing consisting of an eyepiece containing a single lens at one end of a light tube and an objective containing two lenses at the opposite end of said light tube, rotable focus means intermediate said eyepiece and objective forming part of said light tube and adapted to move said objective toward or away from said eyepiece as said focus means is rotated,
   c. a spring tensioned movable slide holder in said housing at the forward end of said light tube having a central aperture into which the objective protrudes,
   d. a vertically disposed slide slot just forward of said slide holder which slot is defined by said slide holder at the rear and by a centrally apertured slide retainer at the front said slot extending through the vertical width of said housing by means of apertures in both the base and cover portions of said housing,
   e. a light deflecting prism forward of said apertured slide retainer said light deflecting prism being in alignment with said light tube, eyepiece and objective,
   f. a light source and a diffuser each being positioned relative to said light deflecting prism and out of alignment with said light tube so that when said light source is lighted the light rays will pass through said diffuser and be deflected through said light deflecting prism, through said slide slot and along said light tube, and
   g. an adjustable energy source located within said housing and interconnected with said light source, comprising battery means, an on-off switch and a potentiometer.

2. A microscope according to claim 1 wherein the eyepiece is mounted in the rear endwall of said rectangular housing.

3. A microscope according to claim 2 wherein said optical path and light deflecting prism are located in said housing along one longitudinal side thereof with said battery means, and light source being housed in the opposite longitudinal side of said housing.

4. A microscope according to claim 3 wherein the intensity of the light from said light source is regulated by a potentiometer controlled by an adjustment wheel mounted in said housing.

5. A microscope according to claim 4 wherein said on-off switch is a push-button switch.

6. A microscope according to claim 3 having a removable access panel in said housing to provide access to said light source and battery means.

* * * * *